United States Patent [19]

Petrzelka et al.

[11] 4,371,357

[45] Feb. 1, 1983

[54] UNIVERSAL JOINT

[75] Inventors: Miloslav Petrzelka, Much-Kranüchel; Werner Krude, Siegburg-Kaldauen, both of Fed. Rep. of Germany

[73] Assignee: Uni-Cardan AG, Siegburg, Fed. Rep. of Germany

[21] Appl. No.: 162,741

[22] Filed: Jun. 25, 1980

[30] Foreign Application Priority Data

Aug. 28, 1979 [DE] Fed. Rep. of Germany ....... 2934630

[51] Int. Cl.³ .............................................. F16D 3/26
[52] U.S. Cl. .................................... 464/128; 464/131; 464/132; 403/57; 403/74
[58] Field of Search ................. 64/17 R, 17 A, 6, 22; 403/57, 74

[56] References Cited

U.S. PATENT DOCUMENTS

| 3,162,471 | 12/1964 | Mazziotti | 64/17 R |
| 3,858,413 | 1/1975 | Nemtsov et al. | 64/17 A |
| 3,881,324 | 5/1975 | Girquis | 64/17 A |
| 3,958,431 | 5/1976 | Moring | 64/17 A |
| 4,130,325 | 12/1978 | Schultenkämper | 64/17 A |

FOREIGN PATENT DOCUMENTS

| 1231736 | 10/1960 | France | 64/17 R |
| 166296 | 2/1959 | Switzerland | 64/17 A |
| 538168 | 1/1977 | U.S.S.R. | 64/17 A |

Primary Examiner—P. S. Lall
Attorney, Agent, or Firm—Toren, McGeady and Stanger

[57] ABSTRACT

A universal joint is formed with trunnions extending into the bores of yokes with bearing bushes being interposed between the trunnions and the yokes. Each of the trunnions is formed with a bore extending internally into the trunnion generally coaxially with the central axis of the trunnion. The trunnion is formed with a wall thickness surrounding the bore and the bearing bush has a wall thickness surrounding the trunnion with the wall thickness of the trunnion being between one and three times the size of the wall thickness of the bearing bush. The trunnion bore may extend with a depth which is at least equivalent to the depth of a generally cylindrical bore within the bearing bush within which the trunnion is received and the central bore in the trunnion may be formed with a conical portion immediately contiguous with a cylindrical portion located inwardly from the conical portion. The conical portion may be formed to widen outwardly with an angle of between 0.5° and 5° relative to the central axis of the trunnion.

2 Claims, 2 Drawing Figures

UNIVERSAL JOINT

The present invention relates generally to universal joints and is particularly adapted for use in joints which are composed of two yokes and of two trunnion bearings which are to be fastened to a shaft flange wherein, with the intermediate arrangement of a bearing bush having a cylindrical inner surface, a trunnion cross with cylindrical trunnions is supported always in two bores of the yoke.

Known universal joints similar in type to the present invention are disclosed in the prior art, for example German Pat. No. 1 122 781, wherein the bearing bushes are constructed in such a way that in the no-load condition of the universal joint shaft the bearing surfaces of the trunnions will not be parallel to those of the bearing bushes. This orientation may result in the creation of a gap between the trunnion and the bush, with the gap becoming greater from the center of the joint toward the exterior thereof. In such cases, disadvantages arise in that, when a conical trunnion is provided, the production of the trunnion by means of a grinding operation becomes very difficult. Also, when a bushing with a conical surface is used, an undercut is created on the inner side which may also be produced only under rather difficult manufacturing conditions.

Furthermore, it is known, for example from German Offenlegungsschrift No. 27 37 557, that the load acting upon a trunnion bearing may be distributed over a plurality of needle bearings arranged in the universal joint so that the bearing characteristics of the joint coupling may be improved and so that its operating life may be extended. For this purpose, the trunnion may be ground to be slightly elliptical and a plurality of bearing needles will absorb the operating forces acting between the trunnion and the bearing bush. It is obvious that this manner of manufacture also involves difficulty because an exact elliptical running surface cannot easily be formed on the trunnions in the manufacturing operation.

In view of the foregoing, the present invention is directed toward providing a universal joint configuration which, by a particular structural orientation of the trunnion cross, and by utilization of specific dimensioning, will operate to effect load distribution on the roller bodies of the bearing of the bushing with improved results and extended service life.

SUMMARY OF THE INVENTION

Briefly, the present invention may be described as a universal joint comprising yoke means including yoke bore means, trunnion cross means including generally cylindrical trunnion means operatively supported in the yoke bore means and defining a generally centrally disposed axis, bearing bush means interposed within the yoke bore means between the trunnion means and the yoke means and means defining a bore extending into the trunnion means from an end face thereof in generally coaxial relationship with said axis.

The trunnion means are formed with a wall thickness $S_Z$ surrounding the bore and the bearing bush means comprise a wall thickness $S_B$ surrounding the trunnion means. The thickness $S_Z$ is dimensioned to be at least equal to the wall thickness $S_B$ but smaller than three times $S_B$.

The bush means is formed with a cylindrical inner surface having a depth 1 within which the trunnion means is received and wherein the bore in the trunnion means is formed with a depth $1_B$ which is at least as large as the depth 1.

The bore in the trunnion means extends for a portion of its depth with a conical wall and the innermost portion of the bore is formed with a cylindrical wall. The conical wall portion of the bore in the trunnion means extends with a cone angle relative to the trunnion means axis which is smaller than 5° but which is equal to or greater than 0.5°.

It is a significant advantage of the present invention that, as a result of the configuration thereof, the trunnion means of the trunnion cross means is capable of elastic deformation under load from the torque which is transmitted and is thereby capable of adjusting to the driving boss of the joint at the inner diameter. As a result, the load is applied more uniformly on the needle bearing over the entire length of the individual needles. This makes possible an optimum utilization of bearing capacity and an extension of the service life of the device where maximum load utilization is required. For elastic deformation of the trunnion means, it is not important to consider the direction of rotation performed by the joint during operation.

As previously indicated, another essential feature of the invention involves the fact that the diameter of the bore in the trunnion means is of a size such that the remaining wall thickness of the trunnion means is equal to or larger than the wall thickness of the bearing bush but is smaller than three times the wall thickness of the bearing bush.

It is an advantage that the bores in the trunnion means are made to have a positive influence on the force distribution in the bearing housing so that there are no varying concentrations of material but so that, on the contrary, the pattern of stresses and forces is optimized by a specific arrangement of material.

Moreover, the bore is formed with a depth which corresponds to at least the steps of the cylindrical inner surface in the bearing bush.

In the embodiment of the invention wherein the bore in the trunnion means conically widens toward the end face of the trunnion means, the conical configuration of the bore wall is formed with a cone angle $\beta$ which is less than 5° but which is equal to or larger than 0.5°. The size of the angle and the diameter of the bore are determined in accordance with the maximum operating torques of the drive shaft.

It is further provided in accordance with the invention that the bore be constructed cylindrically toward the center of the trunnion means or toward the innermost portion of the bore, with the outermost portion of the bore extending conically toward the end face of the trunnion means from the innermost cylindrical portion thereof. The length of the conical portion of the bore corresponds with the length by which the trunnion means project into the bore of the yoke. In this embodiment, the remaining depth of the bore in cylindrical and the distribution of the stresses is influenced by that portion of the bush which projects out of the bore of the yoke.

The various features of novelty which characterize the invention are pointed out with particularity in the claims annexed to and forming a part of this disclosure. For a better understanding of the invention, its operating advantages and specific objects attained by its use, reference should be had to the accompanying drawings

DETAILED DESCRIPTION OF THE PREFERRED EMBODIMENT

Figure 1:
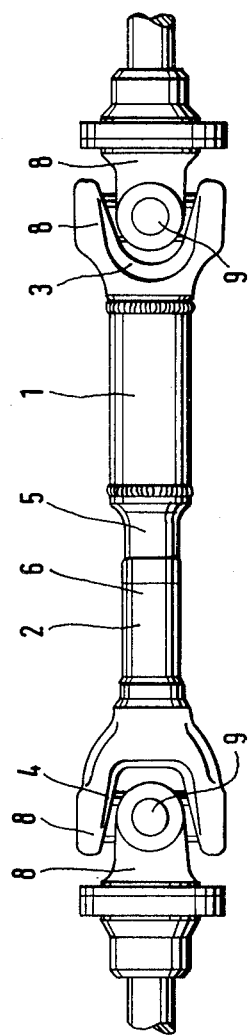
FIG. 1 is an external view of a universal joint shaft assembly having universal joints at opposite ends thereof.

Referring now to the drawings, there is shown in FIG. 1 a universal joint shaft assembly of the type with which the present invention may be utilized and which comprises two coaxial universal joint shaft sections 1 and 2 which carry universal joints 3 and 4 at their outer ends.

The universal joints 3 and 4 are formed to include yokes 8 which are connected through trunnion crosses 9. The universal joint shaft section 1 is constructed at its inner end as a solid shaft 5 and the universal joint shaft section 2 is structured as a hollow shaft 6. A splined connection is formed between the solid shafts 5 and the hollow shaft 6 in order that the sections of the assembly may be axially slideable relative to each other but rotatably fixed.

Figure 2:
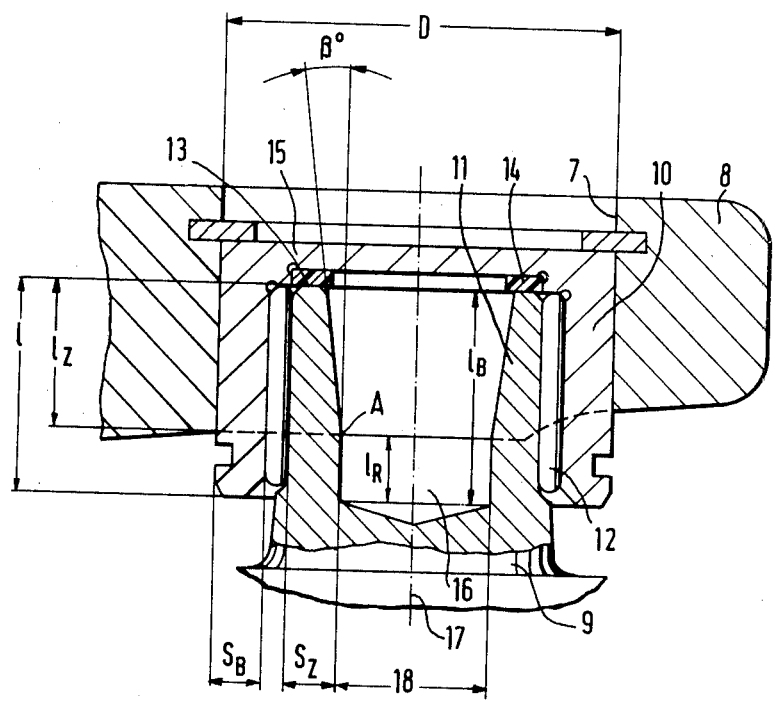
FIG. 2 is a sectional view showing in greater detail the assembly of a trunnion cross in the bore of a yoke of the universal joint assembly.

FIG. 2 shows in greater detail a portion of a universal joint shaft, and more particularly the yoke 8 which includes a bore 7 within which a bearing bush 10 is received. A trunnion 11 of the trunnion cross 9 is guided in the cylindrical inner bore of the bearing bush 10 by means of a roller bearing 12. With the aid of a thrust washer 14, the end face 13 of the trunnion 11 bears against the bottom 15 of the bearing bush 10.

The trunnion 11 of the trunnion cross 9 is formed with a bore 16 extending in the direction toward the center of the joint and formed to be coaxial with a center line 17 of the trunnion 11. The bore 16 commences from the outer end face 13 of the trunnion 11 and extends into the trunnion to a depth $1_B$. The diameter of the bore 16 is selected so that the following relationship will apply regarding the wall thickness of the trunnion:

$$3S_B \geq S_Z = S_B.$$

The depth $1_B$ of the bore 16 of the trunnion cross 9 is dimensioned to correspond with the depth 1 of the inner bore of the bearing bush. Accordingly, the following relationship is applicable:

$$1_B = 1.$$

The bore 16 is formed with an innermost cylindrical portion having a depth $1_R$ and with a conical portion having a depth $1_Z$. The conical portion of the bore 16 extends at an angle $\beta$ and with regard to this conical wall, the angle of $\beta$ extends relative to the center line 17 in accordance with the following formula:

$$5° > \beta \geq 0.5°.$$

The juncture point A at which the conical surface ends and the cylindrical surface of the bore 16 begins is determined by the length $1_Z$ which also represents the distance at which the trunnion cross 9 projects into the bore 7 of the yoke 8. Thus, it will be apparent that the depth $1_Z$ determines not only the depth of the conical portion of the bore 16 but also the extent to which the trunnion 11 extends into the bore 7 of the yoke 8. Commencing from the juncture point A, the bore 16 extends conically toward the outside of the trunnion or toward the end face 13. The remaining cylindrical portion of the bore has a depth which is formed in accordance with the following relationship:

$$1_R = 1_B - 1_Z.$$

While a specific embodiment of the invention has been shown and described in detail to illustrate the application of the inventive principles, it will be understood that the invention may be embodied otherwise without departing from such principles.

What is claimed is:

1. In a universal joint including yoke means having yoke bore means, trunnion cross means including generally cylindrical trunnion means operatively supported in said yoke bore means and defining a generally centrally disposed axis thereof, bearing bush means interposed within said yoke bore means between said trunnion means and said yoke means and means defining a bore extending into said trunnion means from an end face thereof in generally coaxial relationship with said axis, the improvement comprising that said trunnion means has a wall thickness $S_Z$ surrounding said bore, that said bearing bush means has a wall thickness $S_B$ surrounding said trunnion means, that said wall thickness $S_Z$ is at least equal to the wall thickness $S_B$ but smaller than triple the wall thickness $S_B$, that said bearing bush means is formed with a cylindrical inner surface having a depth 1 within which said trunnion means is received, that said bore in said trunnion means is formed with a depth $1_B$ which is at least as large as said depth 1, that said bore is formed with a conical wall portion extending to said end face of said trunnion means, and that said conical wall portion extends at an angle $\beta$ relative to said axis, said angle $\beta$ being at least 0.5° but smaller than 5°.

2. A universal joint according to claim 1 wherein said bore is formed by wall means constructed with a cylindrical configuration extending to the innermost portion of said bore and with a conical configuration extending from said cylindrical configuration to said end face of said trunnion means, said conical wall portion having a length $1_Z$ which corresponds to the length by which said trunnion means projects into said yoke bore means.

* * * * *